United States Patent
Braun et al.

(10) Patent No.: US 6,736,111 B2
(45) Date of Patent: May 18, 2004

(54) DAMPED FUEL RAIL WITH OVER-PRESSURE PROTECTION

(75) Inventors: Charles W. Braun, Livonia, NY (US); Kern E. Haynes, Rush, NY (US)

(73) Assignee: Delphi Technologies, Inc., Troy, MI (US)

( * ) Notice: Subject to any disclaimer, the term of this patent is extended or adjusted under 35 U.S.C. 154(b) by 7 days.

(21) Appl. No.: 10/170,938

(22) Filed: Jun. 13, 2002

(65) Prior Publication Data

US 2003/0230282 A1 Dec. 18, 2003

(51) Int. Cl.[7] ............................................. F02M 37/04
(52) U.S. Cl. ......................... 123/456; 123/467; 138/30
(58) Field of Search ............................... 123/456, 467, 123/531, 533; 138/26–30

(56) References Cited

U.S. PATENT DOCUMENTS

| | | | | |
|---|---|---|---|---|
| 2,977,947 A | * | 4/1961 | Carleton ........................ 138/30 |
| 3,507,263 A | * | 4/1970 | Long ............................ 123/467 |
| 4,161,964 A | * | 7/1979 | Greiner et al. ................. 138/26 |
| 4,205,637 A | * | 6/1980 | Ito et al. ....................... 123/467 |
| 4,615,320 A | * | 10/1986 | Fehrenbach et al. ......... 123/467 |
| 4,649,884 A | * | 3/1987 | Tuckey ......................... 123/457 |
| 4,729,360 A | * | 3/1988 | Fehrenbach et al. ......... 123/447 |
| 5,505,181 A | * | 4/1996 | McRae et al. ................ 123/510 |
| 6,354,273 B1 | * | 3/2002 | Imura et al. .................. 123/467 |
| 2002/0139426 A1 | * | 10/2002 | Kippe et al. ................... 138/30 |
| 2003/0106535 A1 | * | 6/2003 | Zdroik et al. ................ 123/456 |

* cited by examiner

Primary Examiner—Thomas N. Moulis
(74) Attorney, Agent, or Firm—Patrick M. Griffin

(57) ABSTRACT

A fuel rail assembly includes an integral pressure damper and an over-pressure stop to prevent the damper from flexing beyond it elastic limit. The rail assembly also includes injector cups formed outwardly relative to the rail to provide substantially unimpeded fuel flow to the injector. The fuel rail assembly further includes a damper cover to protect the damper from outside damage. The damper cover can be hermetically sealed to form an air chamber above the damper and opposite the fuel chamber in the fuel rail thereby providing a means for keeping the pressure differential between the chambers in an APDI fuel injection system substantially constant.

5 Claims, 3 Drawing Sheets

DAMPED FUEL RAIL WITH OVER-PRESSURE PROTECTION

TECHNICAL FIELD

The present invention relates to an internal combustion engine fuel injection system and more particularly, to a fuel injection system having a fuel rail with integral pressure damping and over-pressure compensation. In one embodiment, the pressure damping system is adapted to an Air Pressure Direct Injector (APDI) fuel injection system.

BACKGROUND OF THE INVENTION

Modern automotive fuel systems typically employ fuel injection systems that precisely control the flow of fuel from the fuel tank to each of the engine's cylinders. In a typical fuel injection system, fuel pressures operate in the range of 300–450 kPa, or even higher. Fuel enleanment to the cylinders and cylinder-to-cylinder maldistribution can occur when fuel flow and fuel pressures are not carefully controlled. Fuel enleanment (not enough fuel delivered to the cylinder) occurs when the amplitude of fuel pressure pulsations measured in the fuel rail varies with engine speed. This has the effect of changing the average fuel pressure while the injector is open, thereby changing the rate of fuel flow for the same injector. Cylinder-to-cylinder maldistribution (uneven apportionment of fuel between cylinders) occurs when the pressure oscillations at the injectors differ from one cylinder to the next during the injector event under constant engine speed and load. The resulting difference in average fuel pressure during the injector event causes variations in cylinder-to-cylinder fuel delivery. Either condition is undesirable and can cause higher emission levels, rough engine operation and a loss in fuel economy.

A typical "direct injector" fuel injection system wherein a metered fuel spray is delivered directly into the combustion chamber incorporates a plurality of electromagnetic injectors mounted in a fuel rail. The fuel rail receives fuel, under pressure, from a high-pressure pump, and delivers the fuel to the injectors. The rail also serves to position each injector so as to aim the injected fuel spray at a precise spot in the combustion chamber. In a typical direct injector fuel injection system, each injector, when pulsed open, simultaneously meters and delivers fuel to the associated combustion chamber. In an Air Pressure Direct Injector (APDI) system a staged injector, comprised of two separate injectors, is constructed to separate the fuel metering event from the fuel delivery event. The staged injector includes a fuel injector for fuel metering and an air injector, coupled in series and immediately downstream of the fuel injector, for the timed delivery of a charge of air along with the metered fuel to the combustion chamber. The APDI system delivers fuel to the fuel injector at approximately 800 kPa and air, through a separate delivery channel, to the air injector at approximately 650 kPa.

In operation, the two injectors of the staged APDI injector are pulsed, slightly out of phase. First, the fuel injector is opened to meter the fuel charge. Then, the air injector is opened to deliver a charge of air along with the charge of metered fuel to the combustion chamber.

In a typical direct injector fuel injection system, each injector is programmed to pulse or open every other revolution of the engine crankshaft. During an injector opening event in a direct injector fuel injection system, the measured fuel pressure in the fuel rail can instantaneously drop by more than 30 kPa, then can increase by more than 50 kPa after the injector closes. For a typical four cylinder engine operating at 2000 RPM, the combined injectors pulse at a rate of 66 pulses per second. In such injector-based systems, these pulses, dropping then raising the pressure in the rail, cause high frequency pressure waves of significant amplitude to propagate through the fuel rail(s) potentially causing erratic delivery of fuel to the cylinders. This condition is aggravated even further in an APDI system where a pair of injectors, firing out of phase, each at 66 pulses per second, induce pressure pulsations into the fuel rails.

In the past, vehicle manufactures have incorporated several types of pressure-damping devices to reduce pressure pulsations in the fuel rails. One such pressure-damping device is a spring diaphragm, similar to a regulator, attached to the fuel rail or the fuel supply line. One acknowledged problem with the spring diaphragm is that it provides only point damping and can lose function at low temperatures. Other problems associated with the use of the spring diaphragm are that it complicates the rail or fuel line, adds more joints susceptible to leakage, can permeate hydrocarbons through the diaphragm, necessitates additional hardware cost, and in many cases does not provide adequate damping.

Another pressure damping device known in the art is an internal rail damper. Two stainless steel shell halves are welded together to form a damper having a sealed airspace filled with trapped air disposed between two compliant sidewalls. The damper shells have relatively large flat or nearly flat sides that flex in response to rapid pressure spikes in the fuel system. The compliant sidewalls absorb the energy of the pressure spikes and reduce the wave speed of the resultant pressure wave thereby reducing the amplitude of the pressure spikes inside the fuel rails during injector firing events. The damping device is disposed inside the fuel rail and must be hermetically sealed and impervious to gasoline. Although internal dampers have excellent damping properties, a known disadvantage is that it requires the use of end supports to properly position the dampers. These support structures are often difficult and expensive to make due to the intricate slots, grooves and keys required to receive the damper and maintain proper positioning. Also, the fuel rail itself must be specially designed to accommodate the support structures and damper. This may lead to larger fuel rails than are otherwise needed. Other disadvantages include additional assembly time and the further expense of rail end plugs and o-rings.

A third pressure-damping device known in the art is a metal fuel rail having flat, flexible walls. The flexing fuel rail is provided with large flat surfaces, designed to flex in response to rapid pressure spikes in the fuel system. As pressure pulses occur, the elastic walls function to dampen the pressure pulsations. A rigid wall section to which the mounting hardware and injectors are necessarily affixed accompanies the flexing wall. While this type of construction serves to dampen the fuel pressure spikes generally, it does not serve to manage the out-of-phase pulses generated by a staged APDI injector. Nor does it have a means for protecting against over-pressure spikes that could permanently distort the flexible walls.

There exists a need in the art for a fuel rail assembly having an internal damper with a means for protecting the damper against over-pressure spikes. Moreover, there is a need in the art for such a damper for use in an APDI system wherein damping can be provided for the out-of-phase pulsing of the APDI staged injector. Finally, there is a need in the art for such a fuel rail assembly constructed substantially from sheet metal components thereby reducing manufacturing cost, simplifying assembly, and saving weight.

SUMMARY OF THE INVENTION

The present invention generally includes a pressure damping fuel rail with integral over-pressure protection for use with fuel injected internal combustion engines. When used with an APDI fuel system, the present invention further provides a means for balancing the pressure pulsations induced by air delivery and fuel delivery systems.

The invention comprises, in one form thereof, a pressure damping fuel rail assembly for use with an APDI system including a lower fuel rail having outwardly formed injector cups for receiving a select number of fuel injectors, a damper cover, and a flexible damper sandwiched between the rail and cover to form a fuel chamber between it and the fuel rail for the delivery of pressurized fuel to the injectors, and an air chamber between it an the damper cover in fluid communication with the air delivery system. Each of the lower fuel rail, damper and damper cover is fabricated from sheet metal. The damper cover defines an over-pressure stop that limits the excursion of the flexible damper when exposed to excessively high fuel pressure spikes in the fuel chamber.

An object of the present invention is to provide a fuel rail assembly that includes a pressure damper with over-pressure spike protection.

Another object of the invention is to provide a fuel rail assembly for an APDI fuel system that provides a means for balancing the out-of-phase pressure pulsations between the fuel delivery and air delivery systems.

A further object of the invention is to provide a fuel rail assembly that can be manufactured simply and relatively inexpensively from relatively lightweight sheet metal.

These objects, features and advantages of the present invention will become readily apparent to those having ordinary skill in the art upon a reading of the following detailed description in view of the appended claims and drawings.

BRIEF DESCRIPTION OF THE DRAWINGS

The nature and mode of operation of the present invention will now be more fully described in the following detailed description in view of the accompanying drawings wherein.

DESCRIPTION OF THE PREFERRED EMBODIMENT

Figure 1:
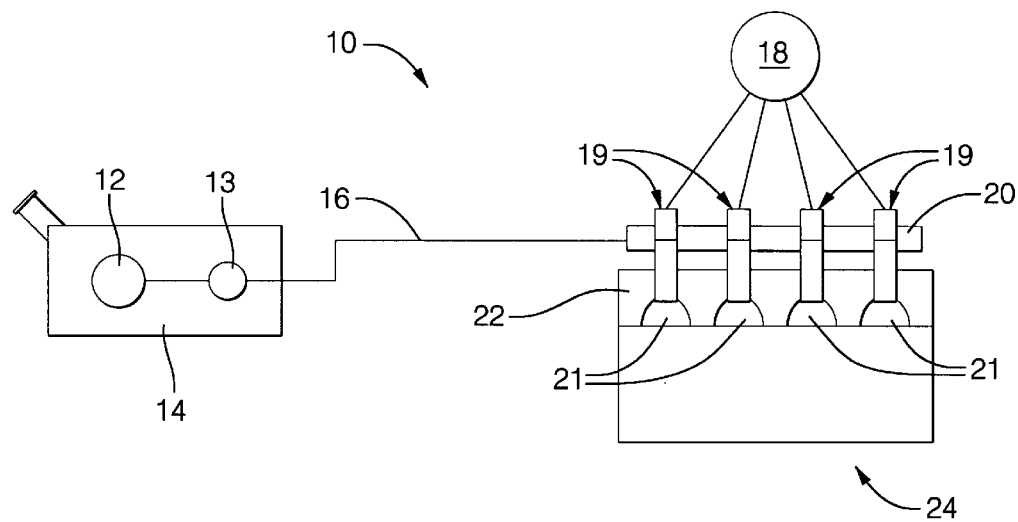
FIG. 1 is a schematic drawing of a returnless fuel system.

Referring to FIG. 1, a returnless fuel system is shown. Returnless fuel System 10 includes high pressure fuel pump 12 and pressure regulator 13 disposed inside fuel tank 14. Regulator 13 is in fluid communication with pump 12. Fuel feed line 16 connects to regulator 13 to supply fuel under pressure to fuel rail 20 for distributing fuel by injectors 19 to engine combustion chambers 21 located in cylinder head 22 of internal combustion engine 24. Fuel injectors 19 (direct injector type shown) are sealably connected to fuel rail 20, as known in the art. In operation, each injector receives an electrical signal from ECM 18 to sequentially disperse a controlled amount of fuel from fuel rail 20 into the combustion chambers 21.

Figure 2:
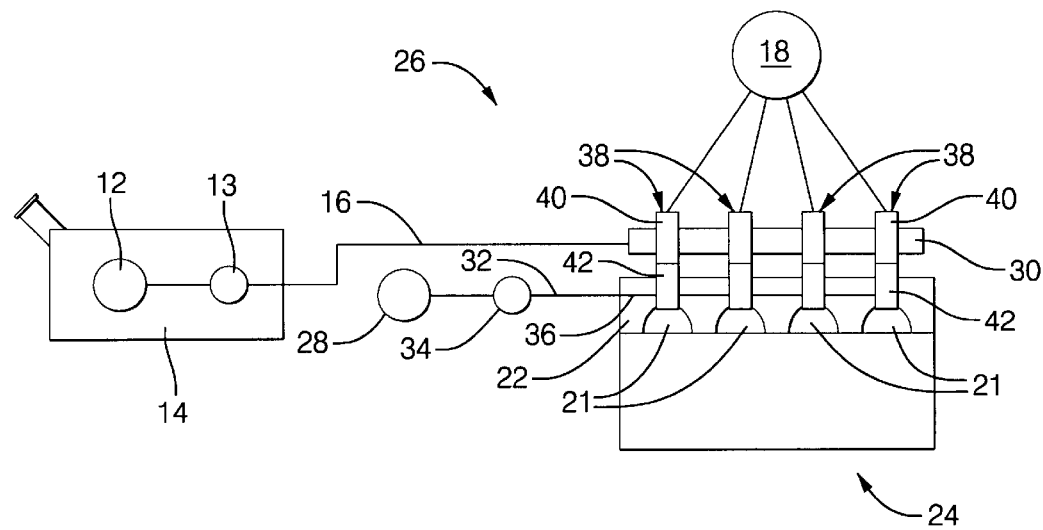
FIG. 2 is a schematic drawing of an APDI fuel system.
Figure 3:
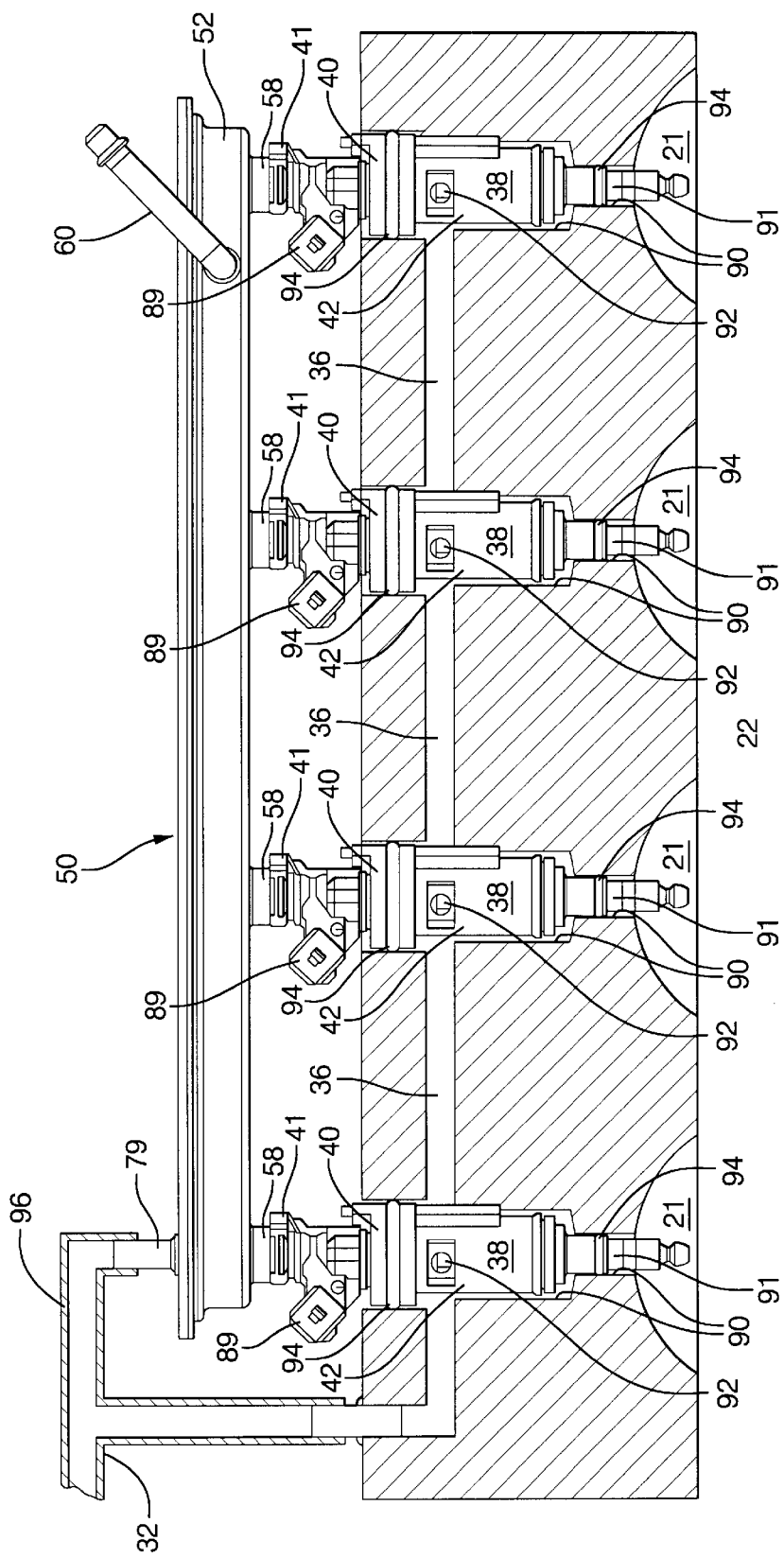
FIG. 3 is a side view of an installed fuel rail assembly of the present invention, with injectors.
Figure 4:
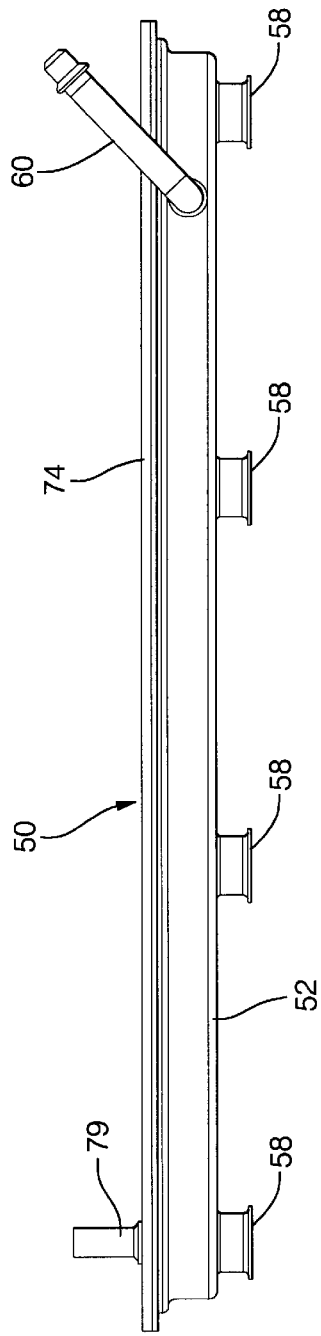
FIG. 4 is a side view the fuel rail assembly shown in FIG. 2, without the fuel injectors.

Referring now to FIG. 2, an APDI fuel system is shown. In addition to the like numbered components common with the returnless system (fuel pump 12, fuel pressure regulator 13, tank 14, fuel line 16, ECM 18, combustion chambers 21, cylinder head 22 and engine 24), the major components of APDI system 26 includes air pump 28, fuel rail assembly 30, air feed line 32, air pressure regulator 34, air passage 36 (preferably disposed in cylinder head 22), and staged fuel injectors 38. Each staged fuel injector includes fuel injector 40 coupled in series behind air injector 42. An outlet end of each staged fuel injector is sealably disposed in stepped bores (not shown) provided in cylinder head 22, making a fluid tight connection with its associated combustion chamber 21 via sealing means (not shown in FIG. 2), as known in the art. Fuel rail assembly 30 defines injector ports each of which sealably receives an inlet end of staged fuel injectors 38, also as known in the art. In operation, pressurized fuel is delivered to fuel rail assembly 30 by fuel pump 12. Fuel pressure to fuel rail 30 is regulated by fuel pressure regulator 13. Through an independent delivery system, air, at a pressure controlled by air pressure regulator 34, is delivered to air passage 36 by air pump 28, preferably driven by the engine, through air feed line 32. When staged fuel injectors 38 are installed in cylinder head stepped bores, an air inlet port (not shown in FIG. 2) of each air injector 42 is sealably aligned with internal air passage 36. Fuel injector 40 and air injector 42 receive sequential electrical signals from ECM 18 through electrical connectors (not shown) to first open fuel injector 40 to meter and disperse a desired amount of fuel into the inlet end of air injector 42, then second to open air injector 42 to direct a charge of air and the metered amount of fuel into the associated combustion chamber 21.

Referring to FIGS. 3 through 6, fuel rail assembly 50 in accordance with the present invention includes lower rail assembly 52, damper 64, and damper cover assembly 74. Lower rail assembly 52 includes lower rail 54. Lower rail 54 defines main body 55, first flange surface 56, second flange surface 57, and a plurality of injector cups 58, each cup being preferably drawn outwardly away from body 55 of lower rail 54 and sized to receive inlet end 41 (FIG. 3) of staged fuel injector 38. Inlet end 41 of injector 38 includes means for making a fluid tight connection with inlet cup 58, such as for example, by o-rings, as is known in the art. Lower rail 54 is preferably formed from sheet metal, preferably from stainless steel.

Figure 6:
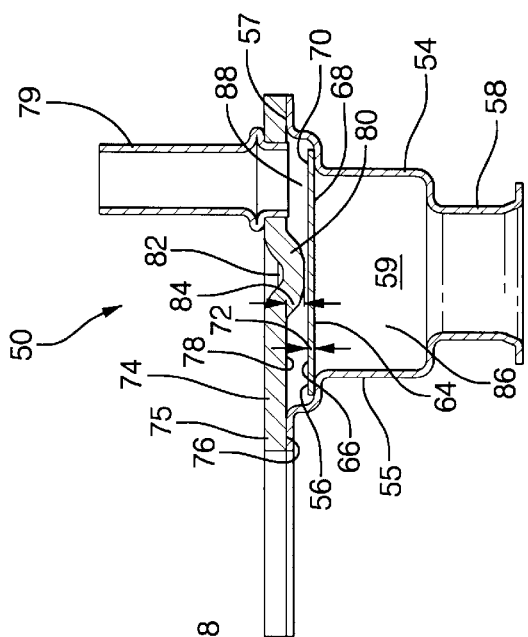
FIG. 6 is an end view of the fuel rail assembly, taken along line 6—6 in FIG. 5.
Figure 5:
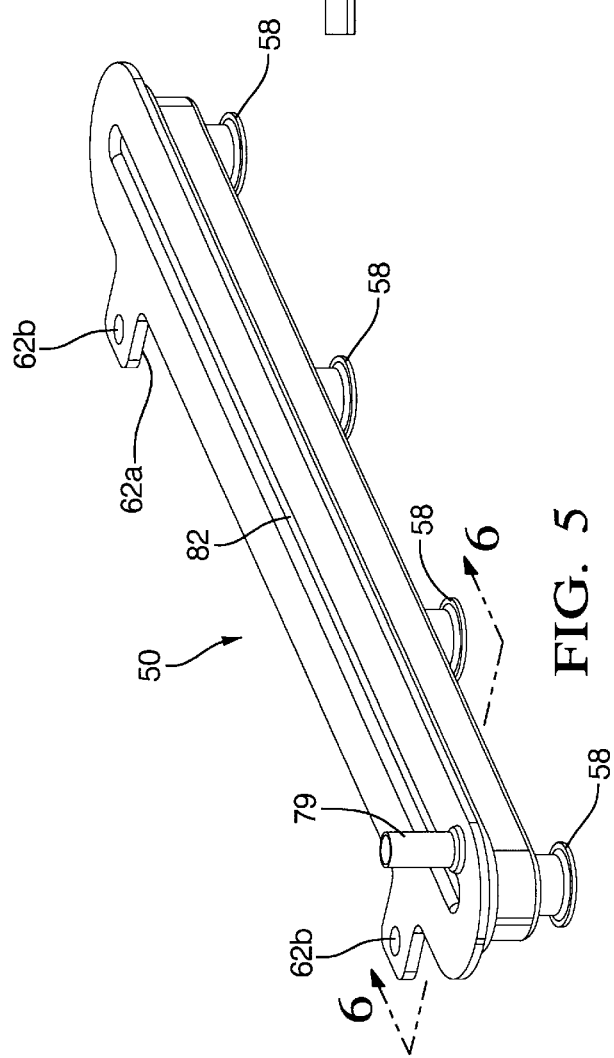
FIG. 5 is an isometric view of the fuel rail assembly shown in FIG. 4 (fuel inlet pipe not shown)

In the prior art, injector cups were typically disposed inwardly in a conventional tubular fuel rail thereby restricting the cross-section fuel flow area of the rail. Under certain operating conditions, such a restriction was known to limit flow of fuel to the injectors and, under hot conditions, cause fuel vapors to substantially block the flow of liquid fuel to the injectors resulting in rough engine operation and stalling. Referring to FIG. 6, in the present invention, improved injector cups 58 are formed outwardly away from main body 55 thereby permitting an unimpeded flow of fuel through flow channel 59 to the injectors to eliminate this problem.

Lower fuel rail 54 also includes fuel inlet fitting 60 for connection with fuel feed line 16 to receive a supply of pressurized fuel from pump 12. Lower rail 54 also defines through bores 62a for receiving fasteners (not shown) for suitable attachment to cylinder head 22 as known in the art. While lower rail 54 shows a bank of four injector cups, it is understood that any number of injector cups can be provided to correspond to the number of cylinders for the particular engine application.

Damper 64 includes upper surface 66, lower surface 68 and peripheral edge 70. Damper 64 is preferably formed from sheet metal, preferably from stainless steel. Damper material, and damper thickness 72 are selected to provide the desired flex, within the elastic range of the material, from normal fuel and air pressures exerted on lower surface 68 and upper surface 66, respectively. An over-pressure protection feature as will now be described is incorporated in fuel rail assembly 50 to prevent damage to the damper in the event that abnormally high pressure spikes are impressed on the damper.

Damper cover assembly 74 includes damper cover 75, and pressure balance tube 79 in fluid-tight engagement with cover 75. Cover 75 further defines cover flange surface 76, through bores 62b for receiving fasteners (not shown) for suitable attachment to cylinder head 22, and inner surface 78. Inner surface 78 further defines overpressure stop 80 formed as a downward directed ridge 82 running longitudinally and central to surface 78. Cover 75 is preferably formed from sheet metal, preferably from stainless steel. The material thickness of damper cover 75 is selected to provide the desirable rigidity for durable attachment to the cylinder head and to protect damper 64 from outside damage. Height 84 of stop 80, spaced a predetermined distance from damper upper surface 66, is selected to limit the flexural excursion of damper 64 when exposed to excessively high fuel pressure spikes.

Fuel rail assembly 50 is assembled by first aligning peripheral edge 70 of damper 64 so that lower surface 68 of damper 64 is in contact with first flange surface 56 of lower rail 54. The peripheral edge of lower surface 68 and first flange surface 56 are joined together in a fluid tight connection such as, for example, by hermetic braze, bonding or bead welding the surfaces together to form fuel chamber 86. Next, cover flange surface 76 and second flange surface 57 of lower rail 54 are stacked together so that through bores 62a and 62b are coaxially aligned. Flange surfaces 57,76 are joined together in a fluid tight connection such as, for example, by hermetic braze, gasketing, bonding or bead welding the surfaces together to form air chamber 88. Thus, once fuel rail assembly 50 is completely assembled, fuel chamber 86 and air chamber 88 are isolated from one another by damper 64. Further, damper cover 75 provides protection to damper 64 from outside damage.

Referring again to FIG. 3, fuel rail assembly 50, including injectors, is shown assembled to an engine. Each staged injector 38 includes fuel injector 40 and air injector 42. Inlet end 41 of each staged fuel injector 38 is sealably received in its associated fuel rail injector cup 58. Cylinder head 22 defines stepped bores 90 for receiving distal end 91 of injector 38. Combustion chambers 21 adjacent distal ends 91 are also shown. Fuel from high pressure fuel pump 12 is supplied to fuel chamber 86 of rail assembly 50 via fuel feed line 16 and fuel inlet fitting 60. Air passage 36 intersects each stepped bore 90 and is in alignment with at least one air inlet 92 of each air injector 42. Air passage 36 (and thus air inlets 92) is in fluid communication with air feed line 32 to receive air, under pressure, from pump 28. Suitable sealing means as known in the art, such as, for example, ring seals 94 are used to prevent cross-leakage between air passage 36 and combustion chambers 21 and to the outside environment. Fuel injector electrical connector 89 and air injector electrical connector (not shown) are electrically connected to ECM 18 by way of electrical leads (not shown) to receive timed electrical signals from the ECM to sequentially open the fuel and air injectors.

In the present invention, pressure balance tube 79 and air chamber 88 above damper 64 are connected, in parallel, to air passage 36 via air balance line 96. Thus, upper surface 66 of damper 64 is exposed to the high-pressure pulsations induced by the opening and closing of the air injectors. At the same time, lower surface 68 of damper 64 is exposed to the high pressure pulsations in the fuel rail induced by the out-of-phase opening and closing of the fuel injectors. As a result, fuel pressure pulsations are transmitted into air chamber 88 and air pressure pulsations are transmitted into fuel chamber 86 thereby keeping the pressure differential between fuel and air chambers 86,88 substantially constant.

While the preferred embodiment disclosed adapts the damped fuel rail with overpressure protection to an APDI fuel injection system, it is understood that these features can be adapted to a direct injector fuel injection system or to a ported fuel injection system as well. If used on one of these non-APDI systems, hermetically sealing cover 75 to lower rail 54 is not necessary. Nor would pressure balance tube 79 be needed since non-APDI systems do not use separate air injectors and therefore do not need a means for handling pressure pulsations induced by the air injectors.

While the preferred embodiment disclosed adapts the damped fuel rail with overpressure protection to a "returnless" type fuel delivery system, it is understood that the invention can be adapted to a traditional "recirculating" type fuel delivery system having a pressure regulator mounted directly to the fuel rail.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An APDI fuel system for timed delivery of air and fuel directly into a combustion chamber of an internal combustion engine, said fuel system comprising:
   a) at least one fuel injector assembly, said at least one fuel injector assembly including a fuel injector and an air injector disposed in fluidic series with said fuel injector;
   b) a means for supplying air to said air injector; and
   c) a fuel rail assembly for supplying fuel to said fuel injector and for receiving air from said air supply means, said fuel rail assembly including a lower rail assembly having a lower rail, a flexible damper having an upper surface and a lower surface, said damper sealably joined to said lower rail to define a fuel chamber therebetween, and a damper cover sealably joined to said damper defining an air chamber therebetween, said air chamber in fluid communication with said air supplied to said air injector whereby said damper is adapted to flex in response to pressure pulsations applied to said damper upper surface and induced by air supplied to said air injector and pressure pulsations applied to said damper lower surface induced by fuel supplied to said fuel chamber.

2. The fuel system of claim 1, wherein said damper cover including an over-pressure stop adjacent said upper surface of said damper whereby said stop limits flexural travel of said damper.

3. A fuel rail assembly for supplying fuel to at least one fuel injector assembly comprising:
   a) a lower rail assembly including a lower rail having at least one injector cup for receiving an inlet end of said at least one fuel injector assembly;

b) a flexible damper having an upper surface and a lower surface, said lower surface of said damper disposed adjacent said lower rail and sealably joined to said lower rail to define a fuel chamber therebetween, said damper adapted to flex in response to pressure pulsations applied to said damper lower surface induced by fuel supplied to said fuel chamber; and c) a damper cover disposed adjacent said upper surface of said damper, said damper cover including an overpressure stop adjacent to and spaced from said upper surface of said damper whereby said stop limits flexural travel of said damper, wherein said damper cover is sealably joined to said flexible damper and lower rail to define an air chamber therebetween, said air chamber in fluid communication with air supplied to said at least one injector assembly, said damper adapted to flex in response to pressure pulsations applied to said damper upper surface induced by air supplied to said at least fuel injector assembly.

4. The fuel rail assembly of claim 3, wherein at least one of said lower rail, damper and damper cover is formed of sheet metal.

5. The fuel rail assembly of claim 3, wherein said lower rail further defines an elongate body and said at least one injector cup is disposed outwardly away from said body whereby said fuel supplied to at least one fuel injector is substantially unimpeded by said at least one injector cup.

* * * * *